United States Patent [19]

Abbott et al.

[11] 4,185,815

[45] Jan. 29, 1980

[54] SHEET FEED

[75] Inventors: Perry E. Abbott, Longmont; Trigg Noyes, Boulder, both of Colo.

[73] Assignee: International Business Machines Corporation, Armonk, N.Y.

[21] Appl. No.: 887,694

[22] Filed: Mar. 17, 1978

[51] Int. Cl.² ............................................. B65H 5/00
[52] U.S. Cl. .................................... 271/225; 271/73; 271/184; 271/191; 271/245; 271/275
[58] Field of Search ............... 271/225, 245, 226, 275, 271/73, 184, 198, 191

[56] References Cited

FOREIGN PATENT DOCUMENTS 558975 9/1932 Fed. Rep. of Germany ............. 271/73
2162653 6/1973 Fed. Rep. of Germany ........... 271/191

Primary Examiner—Richard A. Schacher
Attorney, Agent, or Firm—J. H. Holcombe; C. O. Barth

[57] ABSTRACT

The invention concerns a sheet feed for rapidly and accurately placing a sheet onto a processing station. A carriage is movably mounted above this processing station and reciprocated for feeding. Two belts extend between the sheet feed frame and opposite ends of the movable carriage, leaving an opening in the carriage. When the carriage is reciprocated, the belts transport the sheet to register it, feed it through the carriage opening onto the processing station, hold it down on the processing station, and remove it from there.

15 Claims, 13 Drawing Figures

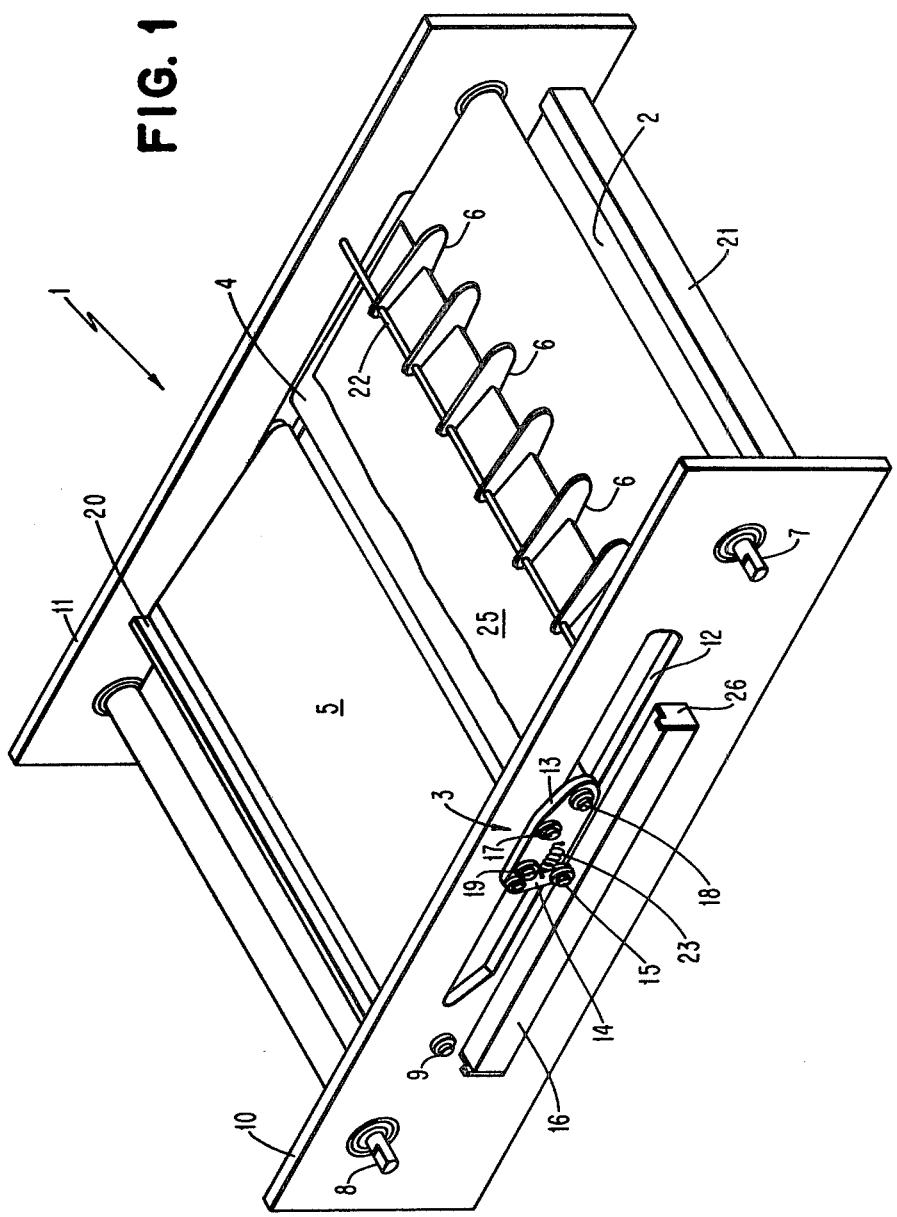

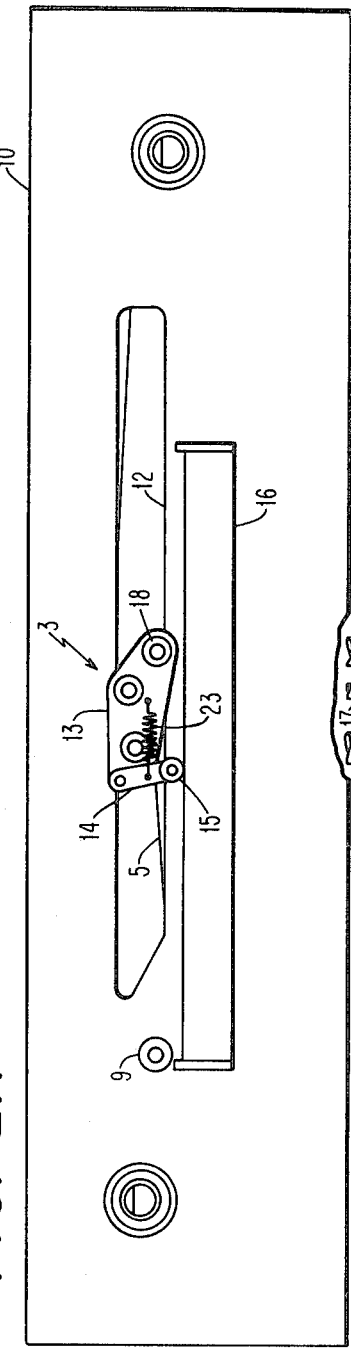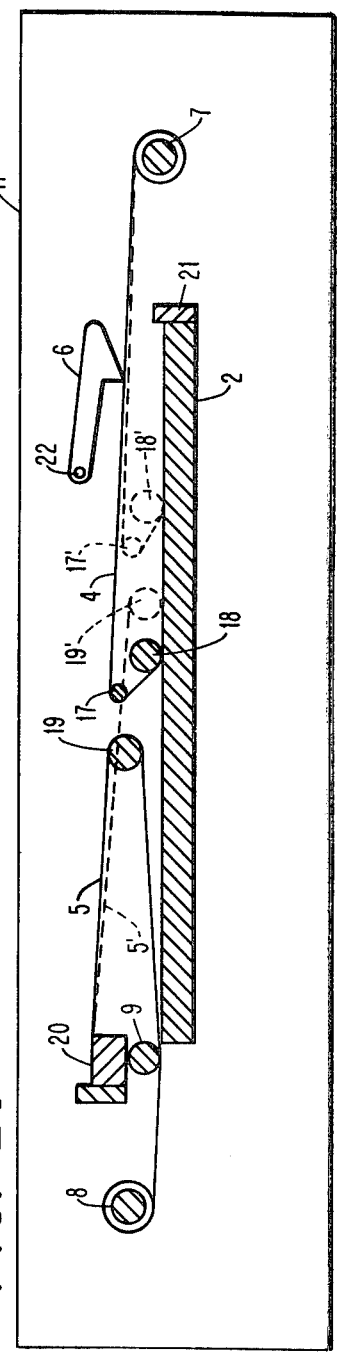

SHEET FEED

DESCRIPTION

The invention concerns a sheet feed for rapidly and accurately placing a sheet onto a processing station and for removing a processed sheet. It is particularly well suited for use as an automatic or semi-automatic document feed for copiers or other reproduction machines.

With the increasing speeds of copiers and reproduction machines, the original or document input becomes more and more a bottleneck area in the reproduction process. Therefore, automatic or semi-automatic document feeds are of particular interest. The invention concerns a sheet feed which can be used as automatic or semi-automatic document feed. However, the invention is not limited to the use of a document feed in the reproduction machine. It has utility for feeding any kind of cut flexible sheet material onto any sort of processing station.

BACKGROUND ART

Various sheet conveyor structures have been employed in prior art sheet feeds. Some prior art mechanisms use pairs of stationary feed rollers driven by associated drive means to convey the sheets. Examples of such roller feeds are shown in Oldenboom U.S. Pat. No. 2,741,960 and Hix U.S. Pat. No 2,859,673.

Alternatively, belts extending along the sheet path have been used for conveying the sheets. Belt conveyors may use belts pair-wise on both sides of the sheet path. An example for such a stationary belt feed is shown in Pratt U.S. Pat. No. 2,719,714. Transport belts may be arranged only on one side of the sheet path as shown by Rogers and Bleau in IBM Technical Disclosure Bulletin, Volume 14, Number 5, October 1971, page 1547, entitled "Document Feed". This last prior art example shows furthermore the combined use of feed rollers and feed belts.

THE INVENTION

The general object of this invention is to provide an apparatus for precisely placing a sheet onto a processing station.

A further object is to achieve a careful placement of sheets onto a processing station and reliable removal therefrom without damaging the sheet.

An additional object is to provide a sheet feed which allows precise alignment of sheet material on a processing station independent of the material's thickness, weight, or stiffness.

A particular object is to achieve dependable handling of very thin sheet material, e.g. onion-skin paper, by a sheet feed.

The invention achieves these and other objects by a sheet feed using a carriage which reciprocates across a processing station. Attached to each end of the carriage are transport belts, which extend from the carriage to the frame supporting carriage and sheet processing station. The whole feeding process can be divided into two phases. During a first phase, the carriage is moved in a first direction across the processing station, whereby one belt transports the sheet to be fed into an aligned holding position approximately parallel but distant from the processing station. Then, in phase two, the carriage reverses its movement whereby any sheet on the processing station is exited and, at the same time, the previously aligned sheet is laid down onto the processing station through an opening in the carriage. When the carriage reaches its end position after this return movement, the sheet can be processed in the processing station because it is held down immovably by at least one belt. Alternatively, sheet processing may be executed already during the return movement of the carriage.

The foregoing and other features of the invention as well as its advantages and applications will be apparent from the following detailed description of the preferred embodiment which is illustrated in the accompanying drawings.

BRIEF DESCRIPTION OF THE DRAWINGS

FIG. 1 is an isometric view of a sheet feed according to the invention.

FIG. 2A is a side elevation of this sheet feed.

FIG. 2B illustrates a section of FIG. 2A in another view.

FIG. 2C shows a longitudinal cross section through the sheet feed.

The following FIGS. 3A-7 show the sheet feed of FIG. 1 in different stages during the feeding process.

In particular, FIGS. 3A and 3B show cross-sectional and side view of the sheet feed at the beginning of a feeding cycle.

FIG. 6 shows a cross-sectional view of the sheet feed of FIG. 1 at a still later point in time of the feeding cycle.

FIG. 7 illustrates the position after completion of the feeding cycle and is identical to FIG. 2A.

DETAILED DESCRIPTION

Figure 3A:
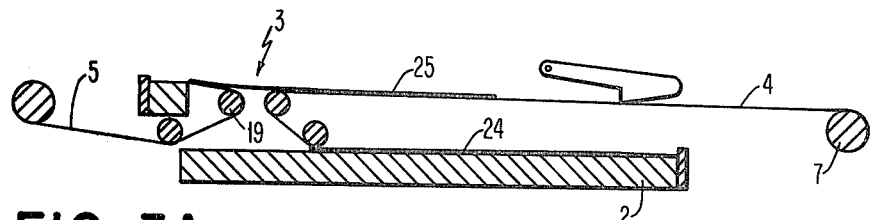

FIG. 1 is an isometric overview of a sheet feed 1 according to the invention. Sheets, i.e., originals or documents, have to be fed onto document glass 2 to be scanned for reproduction. Two plates, front plate 10 and rear plate 11 contain and support the feed mechanism. These plates 10 and 11 are basically symmetrical; both contain a slit 12, which guides movable carriage 3.

As can be seen from FIGS. 1 and 2C, the feeding mechanism consists essentially of two belts, a holding belt 4 and a transport belt 5. The upper end of transport belt 5 is connected to upper crossbar 20, then transport belt 5 is wound around transport roller 19 of carriage 3, and, via stationary roller 9, reaches left take-up shaft 8. Take-up shaft 8 exerts a constant pulling force on transport belt 5 by a not shown torque motor or spring drive, thus keeping belt 5 taut.

Holding belt 4 is fixed to lower crossbar 21 at document glass 2. Via lower holding belt roller 18 and upper holding belt roller 17, holding belt 4 returns to right take-up shaft 7. Take-up shaft 7, again, is turned by an approximately constant force in clockwise direction to tension holding belt 4. This torque can be exerted by an electric motor or spring, not shown. Register finger 6, mounted to finger crossbar 22, touches the surface of taut holding belt 4.

Upper and lower holding belt rollers 17 and 18, and transport belt roller 19 are rotatably mounted to a carriage plate 13 on either side of sheet feed 1. Essentially, rollers 17, 18, and 19 with carriage plates 13 form carriage 3. Lower holding belt roller 18 travels on the surface of slit 12.

Lifting lever 14 is pivotally mounted to carriage plate 13 and, tensioned by spring 23, has basically two positions. In FIG. 1, lever 14 is in its essentially vertical position, its roller 15 travelling on rail 16, thus lifting carriage plate 13 into its upper position. As will be seen later, this lifting of carriage plate 13 has the effect to lift transport belt 5 off document glass 2. If lever 14 is in its essentially horizontal position, as shown e.g. in FIG. 5B, both lower holding belt and transport belt rollers 18 and 19 travel on the surface of slit 12. Then, transport belt 5 touches document glass 2.

Figure 8:
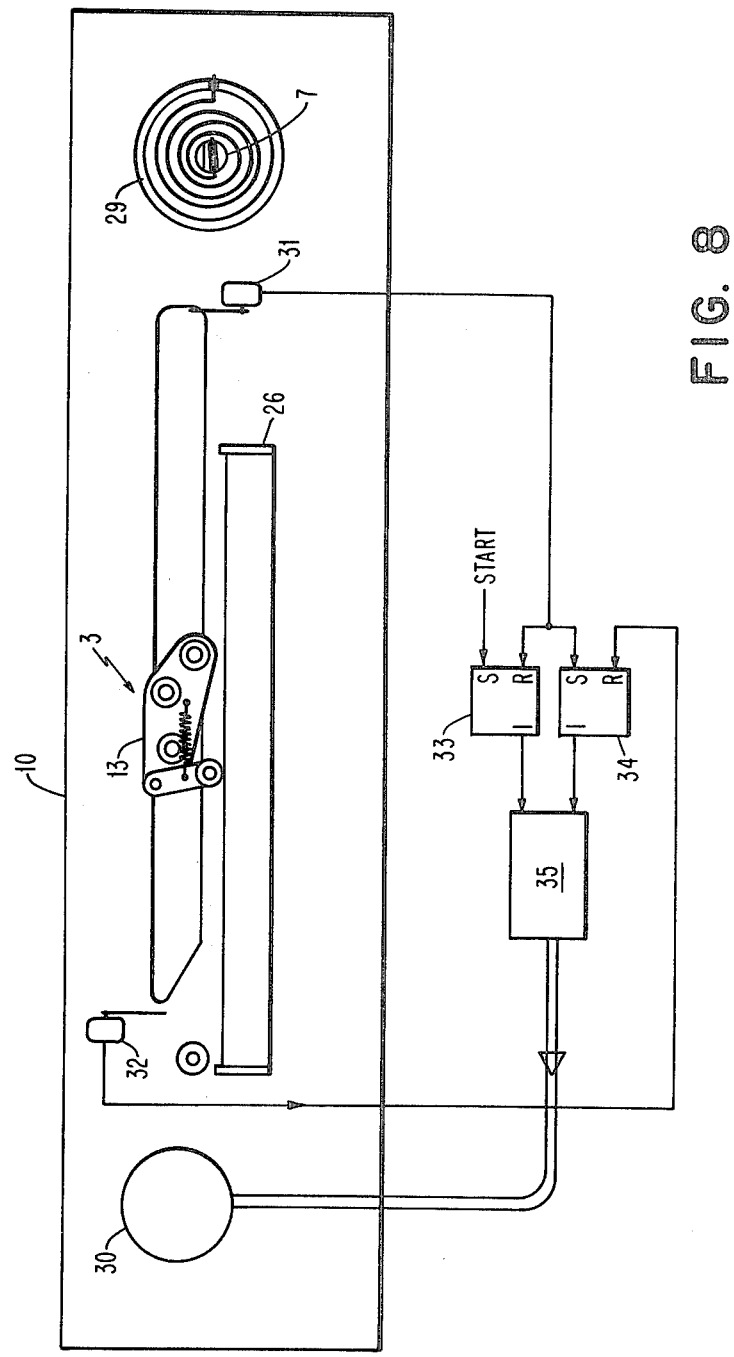
FIG. 8, finally shows an exemplary drive system for the sheet feed according to the invention.

The drive of carriage 3 can be achieved in different ways. Either, when torque loaded right and left take-up shafts 7 and 8 are used as described, carriage 3 can be moved by a chain or similar drive along its path. Another possibility is to drive take-up shaft 8 positively by appropriate control of an attached electrical motor and to tension holding belt 4 by a spring drive attached to take-up shaft 7, as shown in FIG. 8.

FIG. 2A shows a side elevation of sheet feed 1 with carriage 3 in the raised position. Lifting lever 14 is in its essentially vertical position, held by spring 23, its roller 15 traveling on rail 16. Lower holding belt roller 18 is traveling on the surface of slit 12 in front side plate 10. The belts 4 and 5 are practically invisible in this view as they are covered by front side plate 10 and carriage plate 13.

FIG. 2B shows a part of carriage 3 in a view from top to further illustrate its function. The connection of rollers 17, 18, and 19 to carriage plate 13 is shown. Furthermore, lifting lever 14 with its roller 15, tensioned by spring 23, is illustrated.

FIG. 2C shows a cross-section through the middle of sheet feed 1. As already mentioned in connection with the discussion of FIG. 1, the feeding mechanism consists essentially of two belts, holding belt 4 on the right, and transport belt 5. One end being fixed to upper crossbar 20, belt 5 is wound around transport belt roller 19 on carriage 3 and, via stationary roller 9, reaches left take-up shaft 8.

Similarly, holding belt 4 has its lower end fixed to lower crossbar 21, then, running along document glass 2, it reaches lower holding belt roller 18 and upper holding belt roller 17, both being a part of carriage 3, and returns finally to right take-up shaft 7.

Rollers 17', 18', and 19' in FIG. 2C illustrate the position of belts and carriage rollers in the lowered position of carriage 3. Transport belt roller 19' is now traveling on the surface of slit 12 (FIG. 2A), thus lowering transport belt 5' onto document glass 2. The position of upper and lower holding belt rollers 17' and 18' remains essentially unchanged. As will be explained later in connection with the functional description of sheet feed 1, the lowering of transport belt 5 serves to remove a sheet from document glass 2.

Figure 3B:
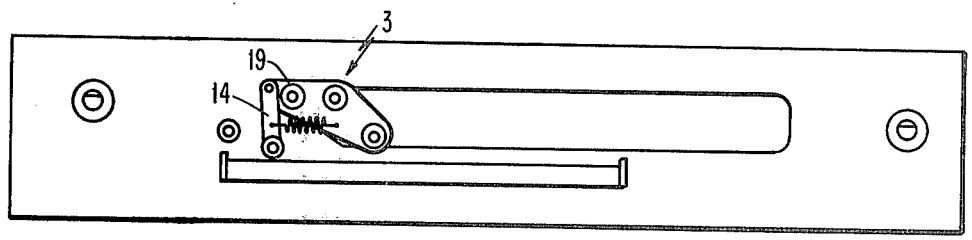

Sheet feed 1 operates in a sequence starting with FIG. 3A. It shall be assumed that a first sheet 24 is already placed on document glass 2. A second sheet or original 25 is placed imprecisely face-down on the top of sheet feed 1, contacting both holding and transport belts 4 and 5. Held by lifting lever 14, carriage 3 is in its raised position. This means that transport belt roller 19 keeps transport belt 5 away from document glass 2. FIG. 3B shows the side elevation with carriage 3 in the same position as in FIG. 3A.

Figure 4A:
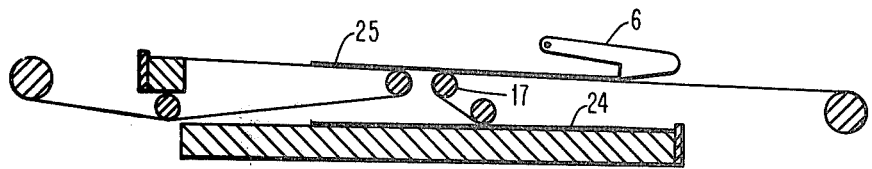
FIGS. 4A and 4B show a cross section and a side view of the sheet feed at a later point in time of the feed cycle.
Figure 4B:
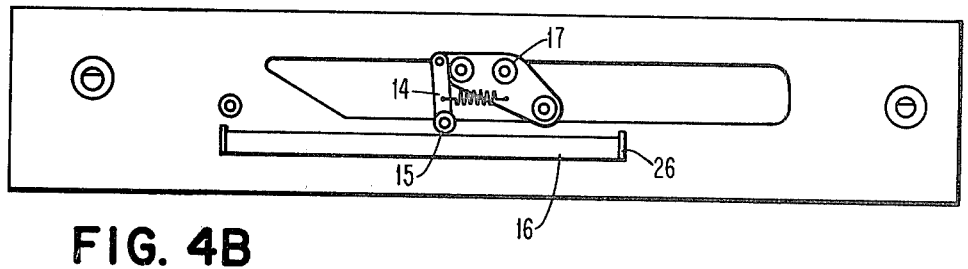

To start the feeding process, carriage 3 moves to the right. FIG. 4A shows carriage 3, still in its raised position, somewhere along the distance to be traveled. Second sheet 25, which was only imprecisely aligned, is transported by holding belt 4 towards register fingers 6 and held against them. FIG. 4B shows the corresponding side view of the cross-section shown in FIG. 4A.

As belts 4 and 5 and carriage 3 continue to move to the extreme rightward position, second sheet 25 is restrained against register fingers 6 until upper holding belt roller 17 passes the edges of register fingers 6. The leading edge of second sheet 25 is then pushed downward by register fingers 6 beneath upper holding belt roller into the gap between roller 17 and transport belt roller 19. As soon as lifting lever roller 15 reaches stop 26 on rail 16, it flips into its horizontal position (FIG. 5B), whereupon transport belt roller 19 is lowered. This again brings the leading edge of second sheet 25 downward into the gap between upper holding belt roller 17 and transport belt roller 19.

Figure 5A:
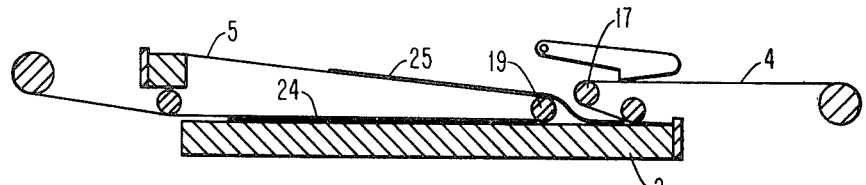
FIGS. 5A and 5B illustrate the sheet feed of FIG. 1 at another point in time of the feeding cycle.
Figure 5B:
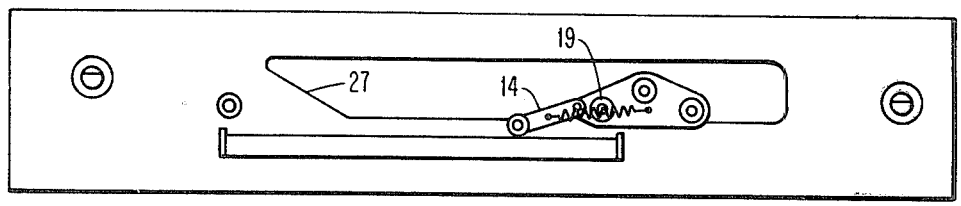

FIG. 5A shows carriage 3 after it has moved slightly to the left. The leading edge of second sheet 25 has been placed on document glass 2. As carriage 3 continues to move to the left, holding belt 4 "rolls" second sheet 25 down onto document glass 2. FIG. 5B shows a side view of sheet feed 1 with carriage 3 in the same position as in FIG. 5A.

Figure 6:
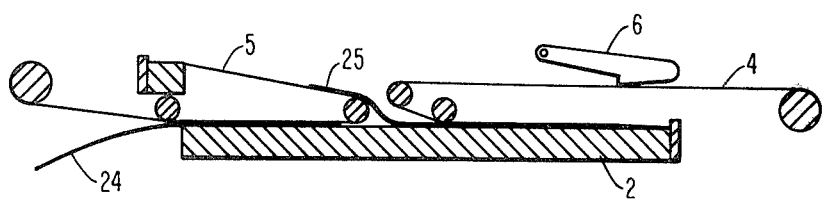

FIG. 6 shows carriage 3 in about its middle position during its leftward travel. Transport belt 5, now touching document glass 2, removes thereby first sheet 24. At the same time, holding belt 4 progressively covers second sheet 25.

Figure 7:
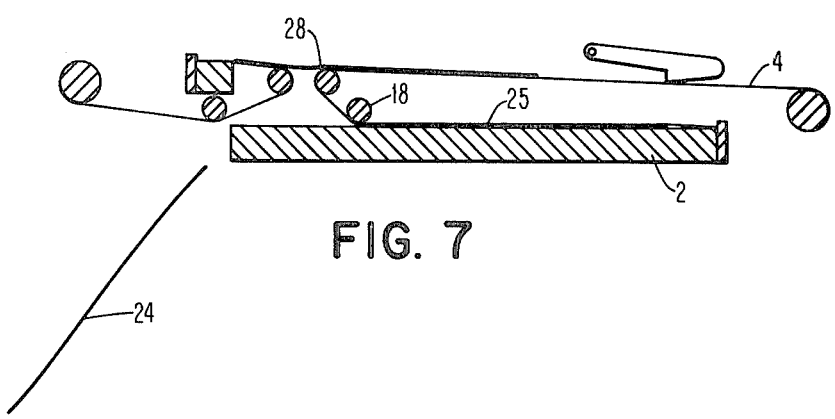

FIG. 7 shows carriage 3 in its extreme leftward position. Second sheet 25 is held down on document glass 2 by holding belt 4. Transport belt roller 19 travels along inclined ramp 27 (FIG. 5B) which lifts carriage 3, whereby lifting lever 14 returns into its vertical position. A new third sheet 28 can now be placed on top of sheet feed 1.

It will be noted that FIG. 7 is identical to FIG. 3A. Thus, a complete feeding cycle is finished.

Preferably, scanning of second sheet 25 is executed during the right-to-left motion of carriage 3. The scanning continues at a rate so as to be complete no earlier than after the left edge of second sheet 25 has been held down against document glass 2. If the scanning motion is in exact synchronism with the moving of carriage 3, scanning can be performed exactly at the moment when the scanned part of second sheet 25 is pressed against document glass 2 by lower holding belt roller 18.

FIG. 8 shows an exemplary drive system for sheet feed 1. A spring drive 29 exerts a torque onto right take-up shaft 7, thus tensioning holding belt 4. A reversible motor 30 is mounted to front side plate 10 for driving left take-up shaft 8 in both directions. It is to be understood that during a motion of carriage 3 towards the right end of sheet feed 1, the energy stored in spring drive 29 actually transports carriage 3. During the return motion of carriage 3 from right to left, a motor 30 winds spring drive 29 again.

A right end switch 31 is positioned to produce an output signal when carriage 3 reaches its extreme rightmost position. Left end switch 32 produces an output signal when carriage 3 is in the extreme left-most position.

The circuit consisting of right end switch 31, left end switch 32, right travel latch 33, left travel latch 34, and motor drive circuit 35 functions in the following manner. A start signal, e.g. a manual push button input signal, sets right travel latch 33. Thereupon, motor drive circuit 35 drives motor 30 in a direction to rotate left take-up shaft 8 in the anti-clockwise direction. Thereby, spring drive 29 on right take-up shaft 7 pulls carriage 3 towards the right.

When carriage 3 reaches its right-most position, right end switch 31 produces an output signal which resets right travel latch 33 and, at the same time, sets left travel latch 34. Now, motor 30 is reversed in its drive direction, whereby left take-up shaft 8 is rotated in the clockwise direction. Transport belt 5 now pulls carriage 3 towards its left-most position. As soon as carriage 3 reaches left end switch 32, left travel latch 34 is reset, thereby stopping motor 30. Now, carriage 3 is again in its initial position and, upon actuation of a start signal, another feed cycle can be executed.

It shall be understood that this is only an exemplary embodiment of the invention. The invention is not limited to the design as shown and disclosed in the specification. The scope of protection is more broadly stated in the appending claims which are to be interpreted liberally to encompass all equivalents.

We claim:

1. Apparatus for registering a sheet on a processing station, comprising:
   a frame mounted to said processing station;
   a carriage mounted on said frame for movement essentially parallel to and across said processing station including first and second return means spaced from each other on said carriage; and
   wherein said carriage is further movable into two positions:
   a first position in which at least one of the return means is a first distance from said processing station, and
   a second position in which said return means is a second distance from said processing station; and
   first and second belt means,
   said first belt means extending from said frame over said first return means on said carriage to a first take-up means on said frame,
   said second belt means extending from said frame over said second return means on said carriage to a second take-up means on said frame.

2. Apparatus as recited in claim 1,
   wherein said second distance of said second position of said carriage is larger than said first distance of said first position of said carriage, whereby said first position of said carriage causes said first belt means to engage a sheet at said processing station for removal, and said second position of said carriage causes said first belt means to form a platform with said second belt means for placement of a sheet thereon.

3. Apparatus as recited in claim 2, wherein said carriage comprises:
   two essentially identical end plates to which said first and second return means are mounted, and
   lifting means, movably mounted to said end plates for supporting said carriage in its second position.

4. Apparatus as recited in claim 1,
   wherein said first belt means is essentially a sheet exit transport means for removing a sheet from said processing station, and
   said second belt means essentially places said sheet onto and holds it on said processing station.

5. Apparatus as recited in claim 4, further comprising:
   reference means mounted on said frame for registering sheets; and
   said second belt means additionally is arranged to move a sheet to said reference means for registration.

6. Apparatus as recited in claim 5, said reference means essentially consisting of a plurality of hinged catches resting upon and spaced across the width of said second belt means.

7. Apparatus for transporting a sheet into a registered position on a sheet processing station, comprising:
   frame means mounted at said processing station;
   carriage means mounted on said frame means for reciprocal movement over said processing station;
   reference means mounted on said frame means for registering a sheet; and
   transport means operated by the movement of said carriage means for moving a supplied sheet to said reference means for registration, for placing said registered sheet onto said processing station, and for holding said placed sheet on said processing station.

8. The apparatus of claim 7, wherein:
   said transport means includes an extensible holding belt means for moving said supplied sheet to said reference means for registration.

9. The apparatus of claim 8, wherein:
   said carriage means additionally includes a return means for supporting said extensible holding belt means and for controlling said movement of said supplied sheet thereby in accordance with the movement of said carriage.

10. The apparatus of claim 9, wherein:
    said extensible holding belt means comprises take-up means mounted to said frame, and belt means extending therefrom around said return means of said carriage means back to said frame so that the portion of said belt means between said take-up means and said return means moves said supplied sheet for registration.

11. The apparatus of claim 8, wherein:
    said transport means further includes an opening thereacross adjacent said belt means for insertion of said supplied sheet, and said transport means is arranged to move said extensible holding belt means thereof beyond said reference means to allow the registered end of said sheet to be inserted through said opening for said placement on said processing station.

12. The apparatus of claim 11, wherein:
    said transport means further includes movable support means adjacent the opposite side of said opening from said extensible holding belt means for supporting said sheet during said registration in one position and, upon said registration of said sheet, movable to another position closer to said processing station to effectively enlarge said opening and aid in said insertion of said sheet therethrough.

13. The apparatus of claim 12 wherein:
    said movable support means of said transport means comprises extensible transport belt means extending from said frame to said carriage means adjacent said openings, movable into said one position to form a platform with said extensible holding belt means for supporting said supplied sheet during said registration, and into said other position closer to said processing station to effectively enlarge said opening and aid in said insertion of said sheet therethrough, and to engage another said sheet at said processing station for removal.

14. The apparatus of claim 11, wherein:
said extensible holding belt means is affixed to said frame at one end, and said carriage means is arranged to reverse direction of said reciprocal movement upon said registration and insertion of said sheet for placing said belt means on said sheet so that the portion of said belt means from said opening to said affixed end holds said sheet on said processing station.

15. The apparatus of claim 14, wherein:
said reference means comprises a plurality of hinged catches resting upon aid extensible holding belt means.

* * * * *